US009521554B2

(12) United States Patent
Farajidana et al.

(10) Patent No.: US 9,521,554 B2
(45) Date of Patent: Dec. 13, 2016

(54) ADAPTIVE CLUSTERING FRAMEWORK IN FREQUENCY-TIME FOR NETWORK MIMO SYSTEMS

(75) Inventors: Amir Farajidana, San Diego, CA (US); Jilei Hou, San Diego, CA (US); Tingfang Ji, San Diego, CA (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1251 days.

(21) Appl. No.: 12/541,018

(22) Filed: Aug. 13, 2009

(65) Prior Publication Data
US 2010/0042716 A1 Feb. 18, 2010

Related U.S. Application Data

(60) Provisional application No. 61/089,450, filed on Aug. 15, 2008.

(51) Int. Cl.
G06F 15/16 (2006.01)
H04W 16/10 (2009.01)
H04W 24/08 (2009.01)

(52) U.S. Cl.
CPC ............. *H04W 16/10* (2013.01); *H04W 24/08* (2013.01)

(58) Field of Classification Search
CPC ............................... H04W 16/10; H04W 24/08
USPC ........ 709/223, 224, 225, 226, 227, 229, 250
See application file for complete search history.

(56) References Cited

U.S. PATENT DOCUMENTS

| 5,613,198 | A | 3/1997 | Ahmadi et al. |
| 5,754,959 | A | 5/1998 | Ueno et al. |
| 5,898,683 | A | 4/1999 | Matsumoto et al. |
| 6,650,900 | B1 | 11/2003 | Chavez, Jr. et al. |
| 6,763,236 | B2 * | 7/2004 | Siren ............................. 455/450 |
| 6,850,190 | B2 | 2/2005 | Ryu et al. |
| 7,460,549 | B1 * | 12/2008 | Cardei et al. ................. 370/408 |
| 7,565,151 | B2 | 7/2009 | Sano |
| 7,894,371 | B2 * | 2/2011 | Bonta ................... H04W 74/02 370/254 |
| 7,924,734 | B2 * | 4/2011 | Pujet et al. .................... 370/252 |
| 8,068,471 | B2 | 11/2011 | Kim et al. |
| 8,155,661 | B2 | 4/2012 | Gerlach |
| 8,315,225 | B2 | 11/2012 | Xu et al. |

(Continued)

FOREIGN PATENT DOCUMENTS

| CN | 1870461 A | 11/2006 |
| CN | 1893308 A | 1/2007 |

(Continued)

OTHER PUBLICATIONS

3GPP TR 25.996 v.7.0.0, "Spatial channel model for multiple input multiple output (MIMO) simulations (Release 7)", Jun. 2007, pp. 1-40.

(Continued)

*Primary Examiner* — Viet Vu
(74) *Attorney, Agent, or Firm* — Charles Chesney

(57) ABSTRACT

A method for wireless communications is provided. The method includes analyzing a set of network parameters and automatically forming a set of network clusters based in part on the network parameters. This includes dynamically selecting at least one network cluster from the set of network clusters to provide wireless service to a subset of user equipment.

34 Claims, 11 Drawing Sheets

(56) References Cited

U.S. PATENT DOCUMENTS

| | | |
|---|---|---|
| 8,320,937 B2 | 11/2012 | Bolin |
| 8,442,143 B2 | 5/2013 | Lee et al. |
| 8,446,872 B2 | 5/2013 | Choi et al. |
| 8,457,642 B2 | 6/2013 | Comeau et al. |
| 2002/0024943 A1 | 2/2002 | Karaul et al. |
| 2003/0186710 A1* | 10/2003 | Muhonen et al. ......... 455/456.5 |
| 2004/0067735 A1* | 4/2004 | Lobley ......................... 455/41.2 |
| 2006/0014554 A1 | 1/2006 | Gerlach |
| 2006/0072501 A1 | 4/2006 | Toshimitsu et al. |
| 2006/0092883 A1 | 5/2006 | Lee et al. |
| 2007/0280166 A1* | 12/2007 | Jung et al. ..................... 370/331 |
| 2007/0280264 A1 | 12/2007 | Milton et al. |
| 2009/0003266 A1 | 1/2009 | Stolyar et al. |
| 2009/0047960 A1 | 2/2009 | Gunnarsson et al. |
| 2009/0082020 A1 | 3/2009 | Ch'ng et al. |
| 2009/0131055 A1 | 5/2009 | Wang et al. |
| 2009/0161688 A1* | 6/2009 | Park et al. .................... 370/441 |
| 2009/0181708 A1 | 7/2009 | Kim et al. |
| 2009/0247159 A1 | 10/2009 | Flore et al. |
| 2009/0264130 A1 | 10/2009 | Catovic et al. |
| 2009/0312027 A1 | 12/2009 | Foschini et al. |
| 2010/0027456 A1 | 2/2010 | Onggosanusi et al. |
| 2010/0035555 A1 | 2/2010 | Bala et al. |
| 2010/0041411 A1 | 2/2010 | Mallik et al. |
| 2011/0028171 A1 | 2/2011 | Guo et al. |
| 2011/0085460 A1 | 4/2011 | Zhang et al. |
| 2011/0159886 A1 | 6/2011 | Kangas et al. |
| 2011/0200029 A1 | 8/2011 | Farmandar et al. |
| 2011/0294527 A1 | 12/2011 | Brueck et al. |
| 2012/0096234 A1 | 4/2012 | Jiang et al. |
| 2012/0113950 A1 | 5/2012 | Skov et al. |
| 2012/0135766 A1 | 5/2012 | Garavaglia et al. |
| 2012/0264466 A1 | 10/2012 | Vainola |
| 2012/0289275 A1 | 11/2012 | Li et al. |

FOREIGN PATENT DOCUMENTS

| | | |
|---|---|---|
| CN | 101001414 A | 7/2007 |
| EP | 0771127 A2 | 5/1997 |
| EP | 1113689 A2 | 7/2001 |
| EP | 1713206 A1 | 10/2006 |
| EP | 1742382 A2 | 1/2007 |
| EP | 1903816 A1 | 3/2008 |
| JP | 7298340 A | 11/1995 |
| JP | 9102977 A | 4/1997 |
| JP | 2001275145 A | 10/2001 |
| JP | 2006033826 A | 2/2006 |
| JP | 2006101497 A | 4/2006 |
| KR | 20060050076 A | 5/2006 |
| TW | 200820653 A | 5/2008 |
| WO | WO9853633 A1 | 11/1998 |
| WO | WO0064213 A1 | 10/2000 |
| WO | WO02080458 A1 | 10/2002 |
| WO | WO03069936 A1 | 8/2003 |
| WO | WO-2006028547 A1 | 3/2006 |
| WO | WO-2007087217 A1 | 8/2007 |
| WO | WO-2007124112 A2 | 11/2007 |
| WO | WO2008011149 A2 | 1/2008 |
| WO | WO-2008019706 A1 | 2/2008 |
| WO | WO2009124083 A1 | 10/2009 |
| WO | WO2009130582 A1 | 10/2009 |

OTHER PUBLICATIONS

3GPP TS 36.300 V8.7.0: Evolved Universal Terrestrial Radio Access (E-UTRA) and Evolved Universal Terrestrial Radio Access Network (E-UTRAN); Overall description; Stage 2, Release 8, Dec. 2008, pp. 1-144.

3GPP TS 36.300 V9.0.0 (Jun. 2009), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

3GPP TS 36.300 v9.4.0, "Evolved Universal Terrestrial Radio Access (EUTRA) Overall description; Stage 2 (Release 9)", Jun. 2010, pp. 1-171.

3GPP TS 36.331 V8.4.0: 3rd Generation Partnership Project; Technical Specification Group Radio Access Network; Evolved Universal Terrestrial Radio Access (E-UTRA) Radio Resource Control (RRC); Protocol specification (Release 8) (Dec. 2008).

3GPP TSG RAN WG1 #55bis, R1-090237: Setup of CoMP cooperation areas, Nokia Siemens Networks, Nokia, Ljubljana, Slovenia, Jan. 12-16, 2009, pp. 1-4.

3GPP TSG RAN WG1 #55bis, R1-090314: Investigation on Coordinated Multipoint Transmission Schemes in LTE-Advanced Downlink, NTT DOCOMO, Ljubljana, Slovenia, Jan. 12-16, 2009, slides 1-13.

3GPP TSG RAN WG1 #55bis, R1-090335: CoMP Scheme and System Level Performance Evaluation for LTE-A, CMCC , Ljubljana, Slovenia, Jan. 12-Jan. 16, 2009, pp. 1-10.

3GPP TSG RAN WG1 #56, R1-090657: Dynamic Cell Clustering for CoMP, LG Electronics, Athens, Greece, Feb. 9-13, 2009, pp. 1-3.

3GPP TSG RAN WG1 #56, R1-090725: Setup of CoMP cooperation areas, Nokia Siemens Networks, Nokia, Athens, Greece, Feb. 9-13, 2009, pp. 1-4.

3GPP TSG RAN WG1 #56, R1-090745: Cell Clustering in CoMP Transmission/Reception, Nortel, Athens, Greece, Feb. 9-13, 2009, pp. 1-4.

3GPP TSG RAN WG1 #56, R1-090793: Coordinated Multi-Point Transmission-Coordinated Beamforming and Results, Motorola, Athens, Greece, Feb. 9-13, 2009, pp. 1-4.

3GPP TSG RAN WG1 #56, R1-090922: Downlink CoMP-MU-MIMO transmission Schemes, CMCC, Athens, Greece, Feb. 9-13, 2009, pp. 1-8.

3GPP TSG RAN WG1 Meeting #56, R1-090823: Discussion on Timing Advance issue in CoMP & Text Proposal, Huawei, RITT, Texas Instruments, CMCC, Athens, Greece, Feb. 9-13, 2009, pp. 1-9.

3GPP TSG RAN WG1 meeting #57, R1-091687: Discussion on the relation between CoMP cooperating set and CoMP reporting set, NEC Group, May 4-8, 2009, pp. 1-3.

3GPP TSG RAN WG1 meeting #57, R1-091903: Adaptive Cell Clustering for CoMP in LTE-A, Hitachi, May 4-8, 2009, pp. 1-6.

3rd Generation Partnership Project; Technical Specification Group Radio Access Network; Evolved Universal Terrestrial Radio Access (E-UTRA); Further advancements for E-UTRA physical layer aspects (Release 9), 3GPP TR 36.814 V9.0.0 (Mar. 2010).

"3rd Generation Partnership Project; Technical Specification Group Radio Access Network; Evolved Universal Terrestrial Radio Access (E-UTRA); Physical layer; Measurements (Release 9 )", 3GPP Standard; 3GPP TS 36.214, 3rd Generation Partnership Project (3GPP), Mobile Competence Centre ; 650, Route Des Lucioles ; F-06921 Sophia-Antipolis Cedex ; France, No. V9.2.0, Jun. 14, 2010 (Jun. 14, 2010), pp. 1-14, XP050441717, [retrieved on Jun. 14, 2010].

CATT: "Aspects of Joint Processing for Downlink CoMP", 3GPP Draft; R1-090942, 3rd Generation Partnership Project (3GPP), Mobile Competence Centre ; 650, Route Des Lucioles ; F-06921 Sophia-Antipolis Cedex ; France, No. Athens, Greece; 20090204, Feb. 4, 2009 (Feb. 4, 2009), XP050318782.

CATT, "Aspects of Joint Processing in Downlink CoMP", 3GPP Draft, R1-090193, 3rd Generation Partnership Project (3GPP), Mobile Competence Centre , 650, Route Des Lucioles , F-06921 Sophia-Antipolis Cedex , France, No. Ljubljana, Jan. 8, 2009, Jan. 8, 2009 (Jan. 8, 2009), XP050318126.

Chttl et al., "A Hybrid Concept of ICIC and CoMP for LTE-A: Initial Evaluation", 3GPP Draft; R1-090956, 3rd Generation Partnership Project (3GPP), Mobile Competence Centre; 650, Route Des Lucioles; F-06921 Sophia-Antipolis Cedex; France, No. Athens, Greece; pp. 1-5, Feb. 9-13, XP050318794, [retrieved on Feb. 4, 2009].

Etri, "Coordinated multi-cell transmission for L TE-Advanced Downlink", R1-082896, Aug. 18, 2008, entire document, intervening reference.

(56) References Cited

OTHER PUBLICATIONS

Hitachi Ltd: "Consideration on Feedback for Adaptive Cell Clustering", 3GPP Draft; R1-100172 Consideration on Feedback for Adaptive Cell Clustering, 3rd Generation Partnership Project (3GPP), Mobile Competence Centre ; 650, Route Des Lucioles ; F-06921 Sophia-Antipolis Cedex ; France, vol. RAN WGI, No. Valencia, Spain; Jan. 18, 2010, Jan. 22, 2010 (Jan. 22, 2010), XP050418414, [retrieved on Jan. 22, 2010] the whole document.
International Search Report and Written Opinion—PCT/US2009/053927—ISA/EPO—Dec. 2, 2009.
Karakayali M.K., et al., "Network Coordination for spectrally efficient Communications in Cellular Systems", Aug. 2006, IEEE Wireless Communications Magazine pp. 56-61.
LG Electronics: "Cell Clustering and Feedback for CoMP", 3GPP Draft; RI-091189, 3rd Generation Partnership Project (3GPP), Mobile Competence Centre ; 650, Route Des Lucioles ; F-06921 Sophia-Antipolis Cedex ; France, No. Seoul, Korea; Mar. 17, 2009, Mar. 17, 2009 (Mar. 17, 2009), XP050338806, [retrieved on Mar. 17, 2009].
LTE; Evolved Universal Terrestrial Radio Access (E-UTRA) and Evolved Universal Terrestrial Radio Access Network (E-UTRAN); Overall description; Stage 2 (3GPP TS 36.300 version 9.2.0 Release 9), Technical Specification, European Telecommunications Standards Institute (ETSI), 650, Route Des Lucioles ; F-06921 Sophia-Antipolis ; France, vol. 3GPP RAN 2, No. V9.2.0, Feb. 1, 2010 (Feb. 1, 2010), XP014046900, p. 56-58.
Motorola, "Coordinated Multi-Point Transmission—Coordinated Beamforming/Precoding and Some Performance Results", 3GPP Draft, R1-090325 Comp Results (Motorola), 3rd Generation Partnership Project (3GPP), Mobile Competence Centre , 650, Route Des Lucioles , F-06921 Sophia-Antipolis Cedex , France, No. Ljubljana, Jan. 8, 2009, Jan. 8, 2009 (Jan. 8, 2009), XP050318236.
Motorola "LTE Advanced Technical Proposals", REV-080011, Apr. 2008, entire document.
Nortel: "Updates on Cell Clustering for CoMP Transmission/Reception", 3GPP Draft; R1-091919(Nortel-Clustering for Comp), 3rd Generation Partnership Project (3GPP), Mobile Competence Centre; 650, Route Des Lucioles; F-06921 Sophia-Antipolis Cedex; France, No. San Francisco, USA; Apr. 28, 2009, Apr. 28, 2009 (Apr. 28, 2009), XP050339406, [retrieved on Apr. 28, 2009].
NTT DoCoMo, "Proposals for L TE-Advanced Technologies", 3GPP TSG RAN WG1 Meeting 53bis, R1-082575, Jun. 30-Jul. 4, 2008, entire document.
Papadogiannis, A., et al., "A Dynamic Clustering Approach in Wireless Networks with Multi-Cell Cooperative Processing." IEEE Communications, 2008. Piscataway, NJ, USA, May 19, 2008, pp. 4033-4037.
Papadogiannis A., et al., "The Value of Dynamic Clustering of Base Stations for Future Wireless Networks", IEEE International Conference on Fuzzy Systems (FUZZ-IEEE 2010), Barcelona, Spain, Jul. 2010 pp. 1-6.
Sivarama Venkatesan Ed—Anonymous: "Coordinating Base Stations for Greater Uplink Spectral Efficiency in a Cellular Network", IEEE International Symposium on Personal, Indoor and Mobile Radio Communications. PIMRC, IEEE; PI, XX, Sep. 1, 2007 (Sep. 1, 2007), pp. 1-5, XP031168849 ISBN: 978-1-4244-1143-6 p. 1, left-hand column, line 20—right-hand column, line 37 p. 2, right-hand column, line 42—p. 5, left-hand column, line 6.
Texas Instruments "Network MIMO Preceding", 3GPP TSG RAN WG1 #53bis, R1-082497, Jun. 30-Jul. 4, 2008, entire document.
T-Mobile Inti., "Candidate Technologies for LTE-Advanced", REV-080047, Apr. 7-8, 2008, entire document.
Ulrich Barth, "Self-X Ran Autonomous Self Organizing Radio Access Networks", 2009 7th International Symposium on Modeling and Optimization in Mobile, Ad Hoc, and Wireless Networks : (WI0PT 2009) ; Seoul, Korea, Jun. 23-27, 2009, IEEE, Piscataway, NJ, USA, [Online] Jun. 23, 2009 (Jun. 23, 2009), pp. 1-36, XP002603562, ISBN: 978-1-4244-4919-4 Retrieved from the Internet: URL:http://www.wi opt.org/pdf/Wi Opt09_Keynote_Speech3.pdf> [retrieved on Oct. 5, 2010] pp. 8, 10-11,14-17.
Weber R., et al., "Self-Organizing Adaptive Clustering for Cooperative Multipoint Transmission", Qualcomm CDMA Technologies, submitted to the IEEE Vehicular Technology Conference 2011.
Alcatel-Lucent, "Uplink Coordinated Multi-Point Reception with Distributed Inter-Cell Interference Suppression for LTE-A", 3GPP TSG RAN WG1 Meeting #58, R1-093366, Shenzhen, China, Aug. 24-28, 2009, 4 pages.
Draft Agenda, 3GPP TSG RAN WG1 Meeting #54, R1-082770, Jeju, South Korea, Aug. 18-22, 2008, pp. 1-2.
LG Electronics, "Network MIMO in LTE-Advanced", 3GPP TSG RAN WG1 Meeting #54, R1-082942, Aug. 18-22, 2008, pp. 1-5.
Listing of www.3gpp.org - /ftp.tsg_ran/wg1_rl1/TSGR1_54/Docs retrieved from web on May 20, 2014, pp. 1-12.
Liu, et al., "Multi-cell MIMO Schemes for IEEE 802.16m", IEEE 802.16 Broadband Wireless Access Working Group, IEEE, C802.16m-08/632, Jul. 7, 2008, pp. 1-8.
Molisch, et al., "Base Station Cooperation", IEEE 802.16 Broadband Wireless Access Working Group, IEEE C80216m-08 817, Jul. 7, 2008, pp. 1-6.
Nortel, "Discussion and Link Level Simulation Results on LTE-A Downlink Multi-site MIMO Cooperation", 3GPP TSG-RAN Working Group 1 Meeting #55, R1-084465, Prague, Czech Republic, Nov. 10-14, 2008, pp. 1-11.
Samsung: "Inter-Cell Interference Mitigation Through Limited Coordination", 3GPP Draft; R1-082886 Inter-Cell Interference Mitigation Through Limited Coordination, 3rd Generation Partnership Project (3GPP), Mobile Competence Centre 650, Route Des Lucioles ; F-06921 Sophia-Antipolis Cedex ; France, No. Jeju; Aug. 12, 2008, Aug. 12, 2008 (Aug. 12, 2008), XP050316366, pp. 1-9.
Samsung, "Inter-Cell Interference Mitigation Through limited coordination", 3GPP TSG RAN WG1 Meeting #54, R1-082886, Jeju, South Korea Aug. 18-22, 2008, pp. 1-9.
Taiwan Search Report—TWO98127448—TIPO—Nov. 6, 2012.

* cited by examiner

ADAPTIVE CLUSTERING FRAMEWORK IN FREQUENCY-TIME FOR NETWORK MIMO SYSTEMS

CLAIM OF PRIORITY UNDER 35 U.S.C. §119

This application claims the benefit of U.S. Provisional Patent Application No. 61/089,450, entitled ADAPTIVE CLUSTERING FRAMEWORK IN FREQUENCY-TIME FOR NETWORK MIMO SYSTEMS, and filed on Aug. 15, 2008, the entirety of which is incorporated herein by reference.

BACKGROUND

I. Field

The following description relates generally to wireless communications systems, and more particularly to adaptive clustering techniques to optimize performance in wireless networks.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

One issue with Network MIMO systems involves cooperation of different cells in the system in the spatial domain—in joint transmission and/or interference coordination. This includes "clustering" of base stations that defines possible cooperation among cells. Cells within a cluster can cooperate in transmission and/or interference management for given frequency-time resources, for example. The clustering is performed to manage the complexity of scheduling among other aspects. However, a problem is that performance of users at cluster boundaries can be compromised since some user equipment may receive excellent service from a statically configured cluster whereas other similarly situated equipment may be poorly serviced.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods provide time-varying and dynamically adaptive clustering to mitigate service disparities among user equipment at cluster boundaries. In one aspect, multiple clusters of cells are adaptively configured. Such configuration can be based off of detected network parameters such as quality of service (QoS) or noise performance parameters, for example. Each clustering of cells can be associated with a set of frequency-time resources that define the cooperation or grouping for the respective resources. The proportion of the frequency-time resources associated with each clustering can be adaptively/dynamically changed based on different parameters, e.g., the number of users and associated equipment benefiting from each clustering.

Resource management between the clusters can be performed in a distributed or in a centralized manner. Clustering of the cells defines possible cooperation patterns among cells, where multiple clustering can be constructed to service different subsets of user equipment. Each clustering can be associated with a frequency-time resources over which the cooperation among cells of each cluster is possible. The amount and pattern (e.g., time pattern or frequency location) of the resources assigned to each clustering of cells can be adaptive and time-varying and it can be controlled in a centralized manner (e.g., master base station communicating with associated cluster stations) or through a distributed scheme among the cells (e.g., nodes collectively monitoring network parameters to determine membership in a cluster).

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to facilitate user equipment performance in a wireless communications system. In one aspect, a method for wireless communications is provided. The method includes analyzing a set of network parameters and automatically forming a set of network clusters based in part on the network parameters. This includes dynamically selecting at least one network cluster from the set of network clusters to provide wireless service to a subset of user equipment. By analyzing the network parameters and automatically forming clusters in this manner, network performance for user equipment is optimized since the equipment is serviced by a cluster selected from a set of clusters that has been adapted to its particular network circumstance and location.

It is noted that in one or more exemplary embodiments described herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 1:
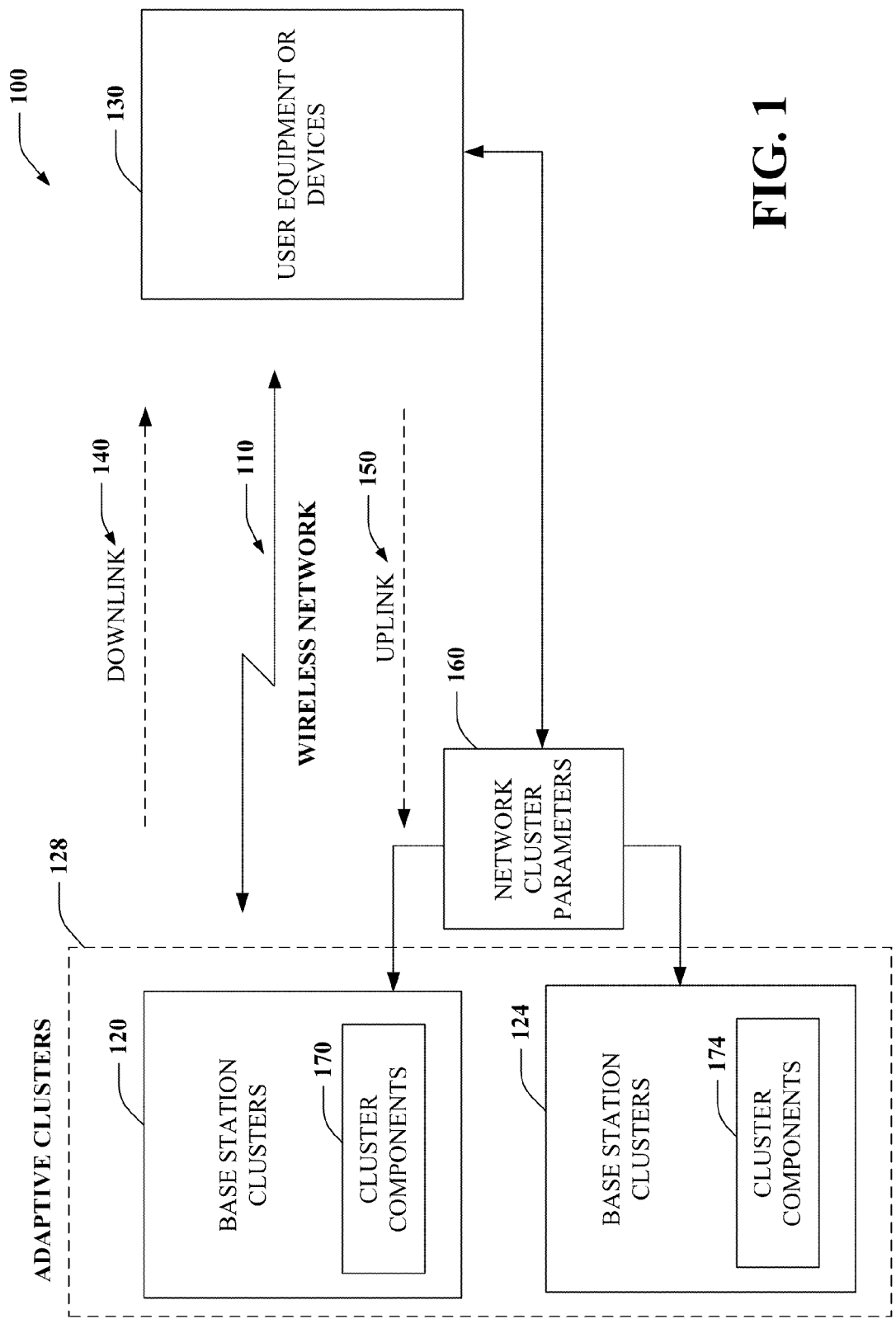
FIG. 1 is a high level block diagram of a system that provides automatic cluster operations and parameter optimizations for a wireless communications system.

Referring now to FIG. 1, a system 100 provides automatic cluster operations and parameter optimizations for a wireless communications system, where the cluster operations are employed to increase the performance of user equipment base station clusters that service the equipment. The system 100 includes one or more base station clusters 120, 124 (also referred to as a node, evolved node B-eNB, femto station, pico station, and so forth) which can be an entity capable of communication over a wireless network 110 to a second device 130 (or devices). Each cluster 120 and 124 includes two or more base stations acting in a cooperative manner, where the collection or aggregation of all base stations are referred to as adaptive clusters 128. Each device 130 (or subset of devices) can be an access terminal (also referred to as terminal, user equipment, station or mobile device). The base station clusters 120 or 124 communicate to the device 130 via downlink 140 and receive data via uplink 150. Such designation as uplink and downlink is arbitrary as the device 130 can also transmit data via downlink and receive data via uplink channels. It is noted that although three components 120, 124, and 130 are shown, that more than three components can be employed on the network 110, where such additional components can also be adapted for the wireless processing and cluster operations described herein.

As shown, network cluster parameters 160 are passed between clusters 120, 124, and devices 130, where cluster components 170 and 174 are employed to determine which stations cooperate as clusters to serve the devices 130. It is noted that cluster control can be distributed between stations or clusters 120, 124 or can be centrally controlled. For example, the clusters 120 and 124 may have separate cluster components at each station that analyze network parameters 160 and determine for themselves whether they belong in a cluster. In another arrangement, one station (or a small subset of stations) may monitor network parameters 160 and effect control over one or more other slave or subsidiary stations. Network parameters 160 can relate to a plurality of factors such as resource allocation needs, interference conditions, signal strength, signal quality, quality of service, and signal-to-noise ratio (SNR), for example. In general, the parameters 160 are analyzed, various clusters are dynamically formed in view of the automated analysis via the cluster components 170 and 174, and different clusters are selected to provide the most optimum service to the device 130 (or device subsets).

Generally, the system 100 provides time-varying and dynamically adaptive clustering to mitigate service disparities among user equipment 130 operating at cluster boundaries. In one aspect, multiple clusters of cells 102 and 124 are adaptively configured. Such configuration can be based off of detected network parameters 160 such as quality of service (QoS) or noise performance parameters, for example. Each clustering of cells can be associated with a set of frequency-time resources that define the cooperation or grouping for the respective resources. The proportion of the frequency-time resources associated with each clustering can be adaptively/dynamically changed based on different parameters 160, e.g., the number of users and associated equipment benefiting from each clustering.

Resource management between the clusters 120 and 124 can be performed in a distributed or in a centralized manner. Clustering of the cells defines possible cooperation patterns among cells, where multiple clustering can be constructed to service different subsets of user equipment 130. Each clustering can be associated with a frequency-time resources over which the cooperation among cells of each cluster is possible. The amount and pattern (e.g., time pattern or frequency location) of the resources assigned to each clustering of cells can be adaptive and time-varying and it can be controlled in a centralized manner (e.g., master base station communicating with associated cluster stations) or through a distributed scheme among the cells (e.g., nodes collectively monitoring network parameters 160 to determine membership in a cluster).

Figure 2:
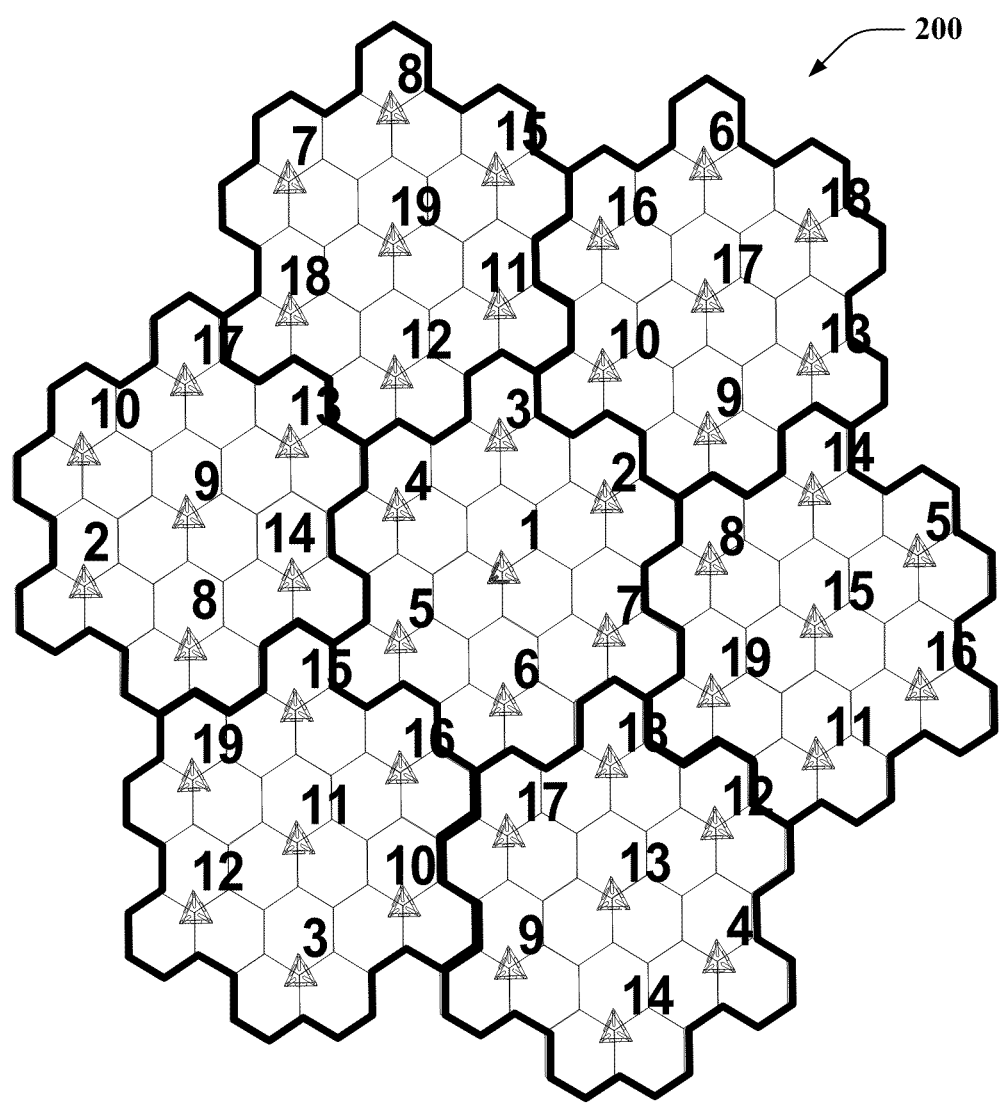
FIG. 2 is a diagram that illustrates an example cluster for a wireless system.

In general, the term "cluster" refers to a subset of the cells in the network 110 that can cooperate in transmission of data to multiple users/equipment in a time-frequency block. Therefore, by definition cells from different "clusters" cannot cooperate. Within each "cluster," a maximum number of cells can cooperate in transmission to particular user equipment 130. Each clustering generally corresponds to partitioning of the cells into clusters. This partitioning can be based on different parameters 160 depending on the cells present in the system. An example of a clustering is shown at 200 of FIG. 2.

It is noted that it is possible to provide multiple "overlapping" clustering of the cells in the network. Thus, cells can participate in multiple clusters. The amount of resources (in time, frequency, and even spatial domain) cell allocated to each cluster can be different and configurable in a semi-static or dynamic manner based on network traffic and users need for service. Resources can also be generalized to account for differing aspects. For example, resources can be applied to spatial resources as well. As previously noted, frequency-time resources can be processed where each cell can be dedicated to cooperation in any specific cluster. In another aspect, resources can be generalized in the spatial domain as well. This can be applicable for the NodeB, base stations, and so forth that are equipped with multiple antennas for transmission or reception. In one example, each cell can allocate a number of its physical antennas for each cluster that it is participating in. In another form, each cell can form a number of beam directions resulting in virtual antennas and can partition these virtual antennas between different clusters it is part of. In the context of CDMA, codes available at each cell can also be applied as resources and hence can be partitioned and assigned to different clusters. Thus, resources can include, time, frequency, spatial dimension and code.

It is also be appreciated that the shapes of the cells that are described and illustrated herein can be of substantially any form or collection or grouping. Thus, although hexagonal networks can be employed, other network forms are possible having irregular or non-traditional geometric forms. Increasing the cluster size will increase the amount of cooperation possible but at the same time will typically increase the complexity of network architecture and scheduling. Corresponding to each clustering, there can be some user equipment 130 that will be in cluster boundaries. To overcome the boundary issue, the system 100 automatically defines multiple clustering of the cells, where each clustering corresponds to cooperation among cells within each cluster a for specified time-frequency resource which are described in more detail below.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g. communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 3:
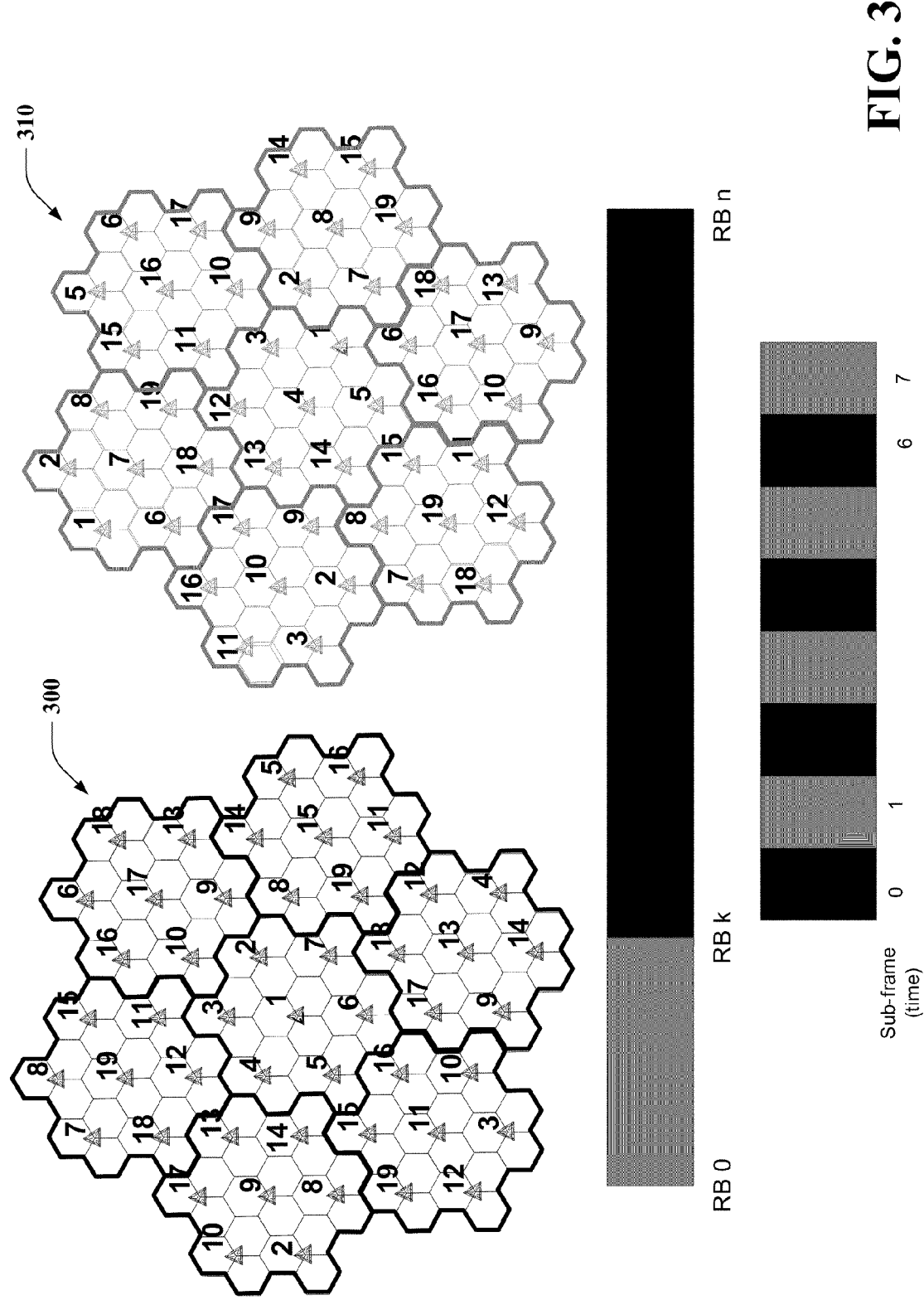
FIGS. 3 and 4 illustrate alternative clustering examples for a wireless communication system.

Referring now to FIG. 3, multiple shifted clusters are illustrated for a wireless system. As noted previously, corresponding to each clustering, there will be some user equipment that will be in "cluster" boundaries. To overcome this issue, dynamic multiple clustering of the cells is provided. Thus, each clustering of cells corresponds to cooperation among cells within each cluster for a specified time-frequency resource. An example can be two clustering of the cells shown at 300 black and 310 grey. Clustering at 300 defines possible cooperation in "black" part of the frequency and "grey" clustering at 310 defines possible cooperation in the "grey" part of the frequency. The "clustering" can also be defined in time domain. For instance in FIG. 3, "black" clustering can define cooperation in even sub-frames and "grey" clustering can define cooperation in odd sub-frames.

Figure 4:
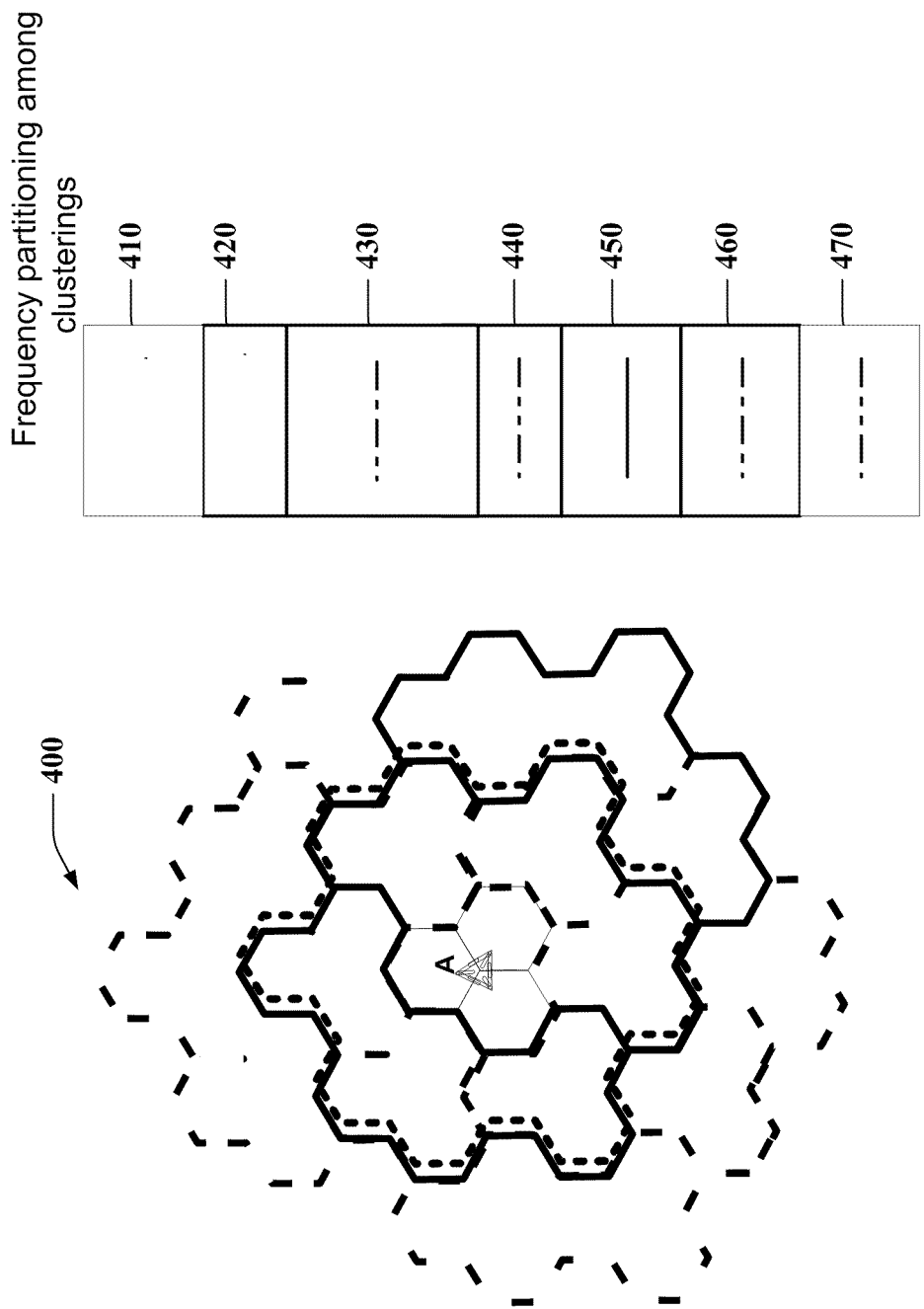

The information on the clustering and the frequency-time blocks corresponding to each clustering will be available among NodeBs or base stations. This can be obtained in a centralized manner or through a distributed scheme among NodeBs. The fraction of resources allocated to a clustering can adaptively change over time. This change can be performed in a distributed or centralized manner among the cells. This adaptive and selecting process can be based on a utility that depends on user equipment benefit from each particular clustering. As special cases, the allocated blocks can be fixed over time, frequency or both FIG. 4 illustrates an alternative clustering for a wireless system. As an example, consider the "clustering" obtained by shifting the "black" clusters of (diagram 300 FIG. 3) in six different directions. In this case, each NodeB (e.g. NodeB A) will belong to 7 different "clustering" configurations or cluster sets as shown at 400 of FIG. 4. In this case for instance, the NodeBs that can cooperate with NodeB 1 are as follows:

Clustering pattern 410: NodeBs 2-7
Clustering pattern 420: NodeBs 3, 4, 5, 12, 13, 14
Clustering pattern 430: NodeBs 5, 6, 7, 16, 17, 18
Clustering pattern 440: NodeBs 2, 7, 18, 6, 8, 19
Clustering pattern 450: NodeBs 2, 3, 4, 10, 11, 12
Clustering pattern 460: NodeBs 2, 7, 3, 8, 9, 10
Clustering pattern 470: NodeBs 4, 5, 6, 14, 15, 16

In the following example, it is possible to limit a data gateway, e.g., where the IP packets arrive to NodeBs at the center of "black" clustering. That is NodeBs 1, 15, 13, 11, 9, 19, and 17. These NodeB's, are referred to as "master NodeBs". These nodes will typically be present in all "clustering"s defined in the example. The resource partitioning can be performed by negotiation among the "master NodeBs".

Figure 5:
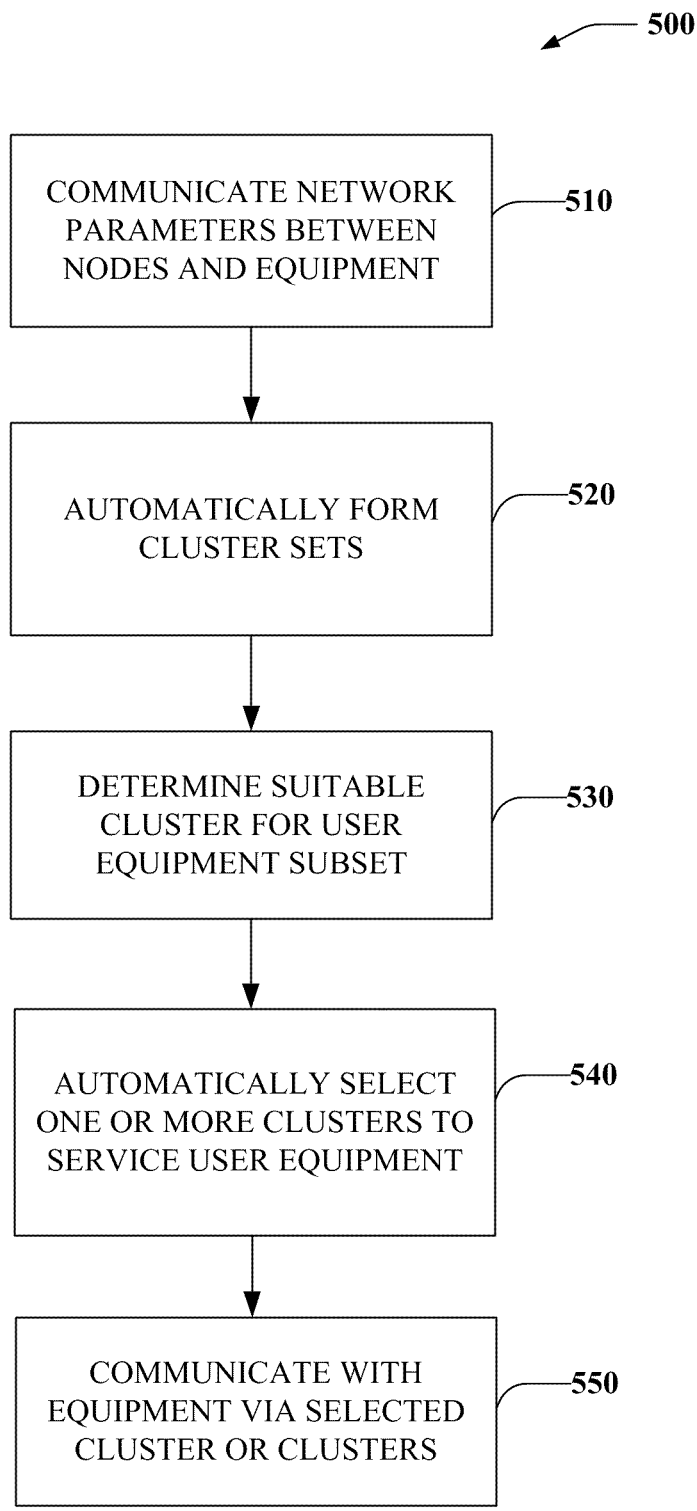
FIG. 5 is a flow diagram of an adaptive cluster process for a wireless communications system.

Referring now to FIG. 5, a wireless communication methodology 500 for cluster and wireless optimization is illustrated. While, for purposes of simplicity of explanation, the methodology (and other methodologies described herein) are shown and described as a series of acts, it is to be understood and appreciated that the methodology is not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter. In general, the process 300 can be implemented as processor instructions, logical programming functions, or other electronic sequence that supports automatic handover control and parameter optimizations described herein.

Proceeding to 510 of FIG. 5, network parameters are communicated between base station nodes and user equipment. Such parameters can be related to recourses, signal conditions, service requirements, and other factors as previously described. At 520, cluster sets are automatically formed and determined from the analyzed parameters. For examples, three frequency shifted clusters may be formed where one set serves one subset of wireless devices, another cluster serving another subset and so forth. As used herein, a subset of devices includes one or more wireless devices that can communicate with the respective clusters. At 530, suitable clusters are determined for the respective user equipment or device subsets. This can include dynamic determinations that couple a potential cluster with a potential device subset. Such coupling can be based on parameter optimization for example. In one example, couple a cluster subset with the subset of devices that maximizes quality of service to the subset. At 540, based on an analysis of the network parameters and other factors such as cluster loading, one or more clusters are automatically selected to service one or more subsets of devices. At 550, after the clusters have been selected for the devices, communications can commence between the devices and the respective clusters.

The techniques processes described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
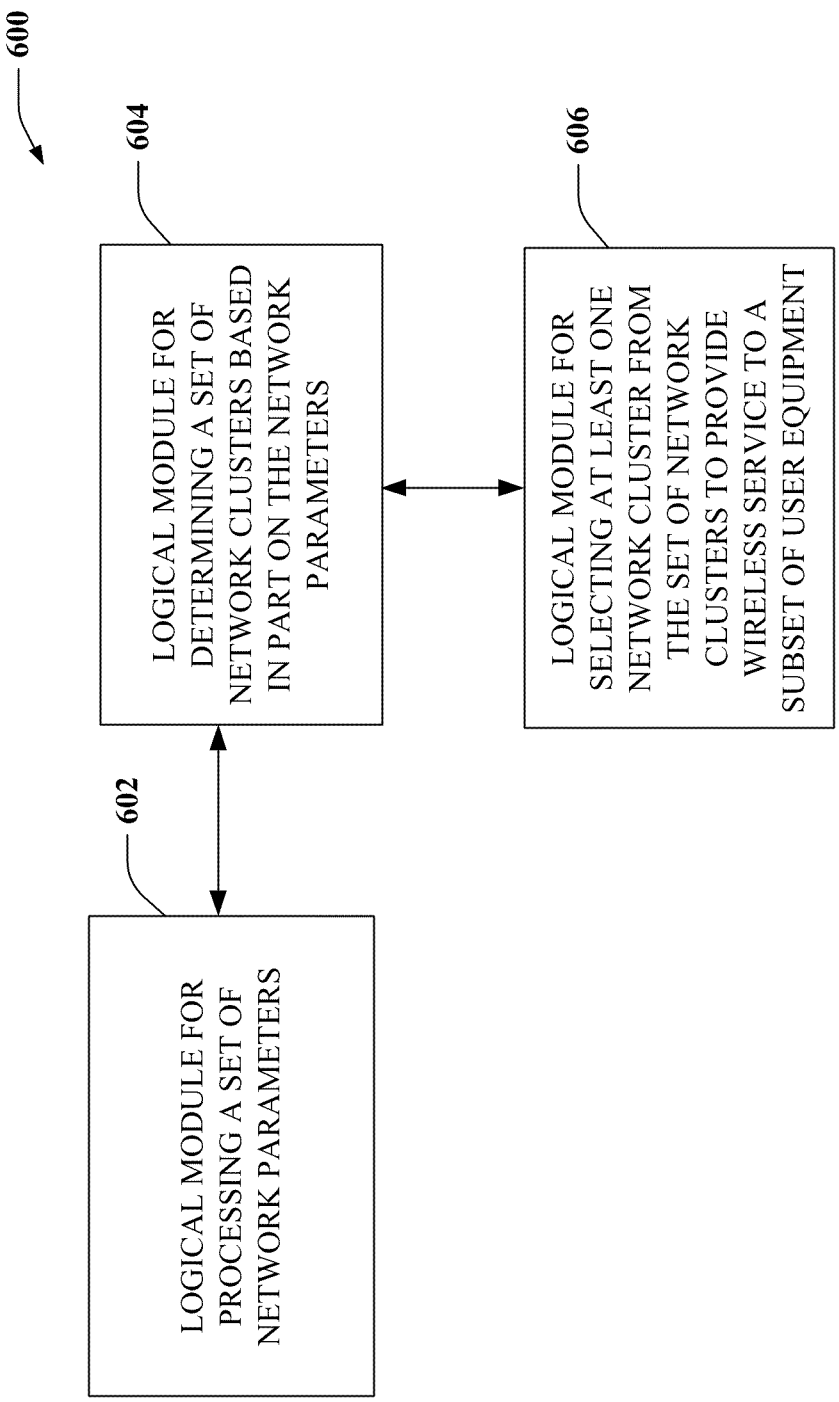
FIG. 6 illustrates an example logical module for automatic cluster processing.
Figure 7:
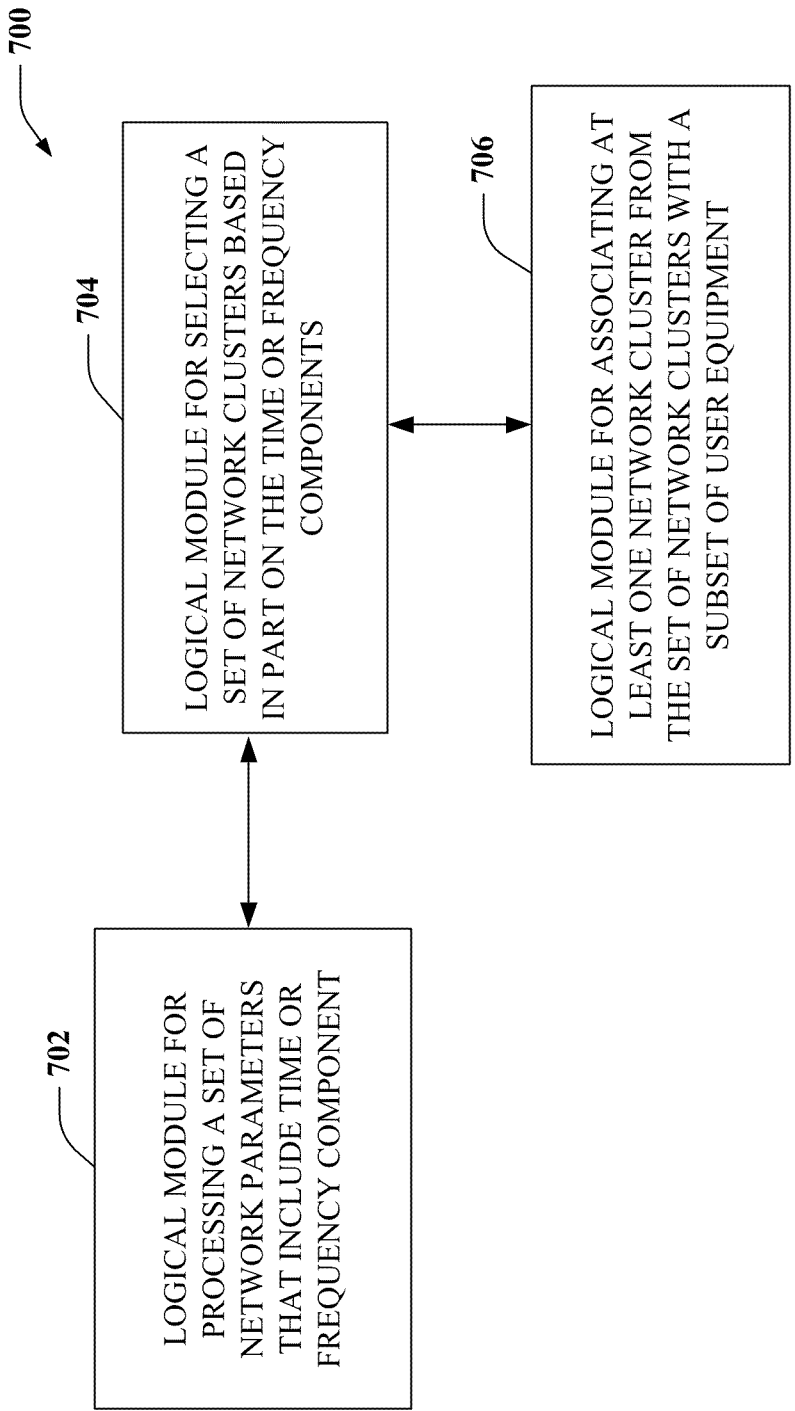
FIG. 7 illustrates an example logical module for alternative cluster processing.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 or means for processing a set of network parameters. This also includes a logical module 704 means for determining a set of network clusters based in part on the network parameters. This also includes a logical module 706 or means for selecting at least one network cluster from the set of network clusters to provide wireless service to a subset of user equipment.

Referring to FIG. 7, a wireless communication system 700 is provided. The system 700 includes a logical module 702 or means for processing a set of network parameters that include time or frequency components. This includes a logical module 704 or means for selecting a set of network clusters based in part on the time or frequency components. The system 700 also includes a logical module 706 or means for associating at least one network cluster from the set of network clusters with a subset of user equipment.

In another aspect, a method for wireless communications is provided. The method includes analyzing a set of network parameters; automatically forming a set of network clusters based in part on the network parameters; and dynamically selecting at least one network cluster from the set of network clusters to provide wireless service to a subset of user equipment. The network parameters include time parameters, frequency parameters, resource allocation parameters, interference condition parameters, signal strength parameters, signal quality parameters, quality of service parameters, or signal-to-noise ratio (SNR) parameters. The method includes controlling the network clusters from a centralized network node. This includes controlling the clusters via distributed processing across multiple nodes. The method also includes controlling a specified time or frequency resource and automatically defining one cluster in one frequency band and automatically defining at least one other cluster in at least one other frequency band. This also includes automatically defining one cluster according to one time period and automatically defining a cluster according to at least one other time period.

The method includes automatically defining one cluster according to an even subframe and automatically defining at least one other cluster according to an odd subframe. This also includes reducing a utility that determines cluster based on a benefit analysis to a subset of user equipment and allocating resource blocks in a fixed manner over time or frequency. This includes automatically creating clusters by shifting a base cluster in multiple time or frequency directions, where the base cluster is shifted in at least six different frequency directions. The method includes monitoring feedback from user equipment to determine a suitable cluster and applying multiple cluster communications to a user equipment subset and monitoring feedback from the communications. This includes automatically selecting a cluster subset that optimizes network performance with the user equipment.

In another aspect, a communications apparatus is provided. This includes a memory that retains instructions for processing a set of network parameters, dynamically forming a set of network clusters based in part on the network parameters, and automatically selecting at least one network cluster from the set of network clusters to provide wireless service to a subset of user equipment; and a processor that executes the instructions.

In another aspect, a computer program product is provided. This includes a computer-readable medium that includes code for managing handovers, the code comprising: code for causing a computer to analyze a set of network parameters; code for causing a computer to aggregate a set of network clusters based in part on the network parameters; and code for causing a computer to determine at least one network cluster from the set of network clusters to provide wireless service to a subset of user equipment. This can include an apparatus, resource allocation parameters, interference condition parameters, signal strength parameters, signal quality parameters, quality parameters, and so forth. This can also include resource allocation parameters, interference condition parameters, signal strength parameters, signal quality parameters, or other quality data.

Other aspects include network resources that include time, frequency, spatial dimensions or spreading codes. This includes controlling the network clusters from a centralized network node or controlling the clusters via distributed processing across multiple nodes. This can include controlling a specified time or frequency resource and automatically defining one cluster in one frequency band and automatically defining at least one other cluster in at least one other frequency band. This can also include automatically defining one cluster according to one time period and automatically defining a cluster according to at least one other time period, or automatically defining one cluster according to an even subframe and automatically defining at least one other cluster according to an odd subframe. Other aspects include reducing a utility that determines a cluster and the resources assigned to it based on a benefit analysis to a subset of user equipment. This includes allocating resource blocks in a fixed manner over time or frequency and automatically creating clusters by shifting a base cluster geographically and assigning different network resources to each cluster created. The base cluster is assigned at least six different network resources to each cluster created. This includes monitoring feedback from user equipment to determine a suitable cluster and applying multiple cluster communications to a user equipment subset and monitoring feedback from the communications. This also includes automatically selecting a cluster subset that optimizes network performance with the user equipment and forming one or more master cells that are common across different clustering configurations. Other aspects include providing a data gateway to the master cells and configuring one or more overlapping clusters in the network. This can include semi-statically reconfiguring one or more cluster sets based on the network parameters and adapting the cluster sets to network requirements. Other aspects include allocating network resources; an apparatus; at least six different network resources; master cells; network resources; one or more cluster sets; one or more master cells; one or more overlapping clusters; resource allocation parameters; interference condition parameters; signal strength parameters; signal quality parameters; quality, time, frequency, spatial dimensions. This includes allocating network resources, apparatus, resource allocation parameters, interference condition parameters, signal strength parameters, signal quality parameters, quality, and so forth.

Figure 8:
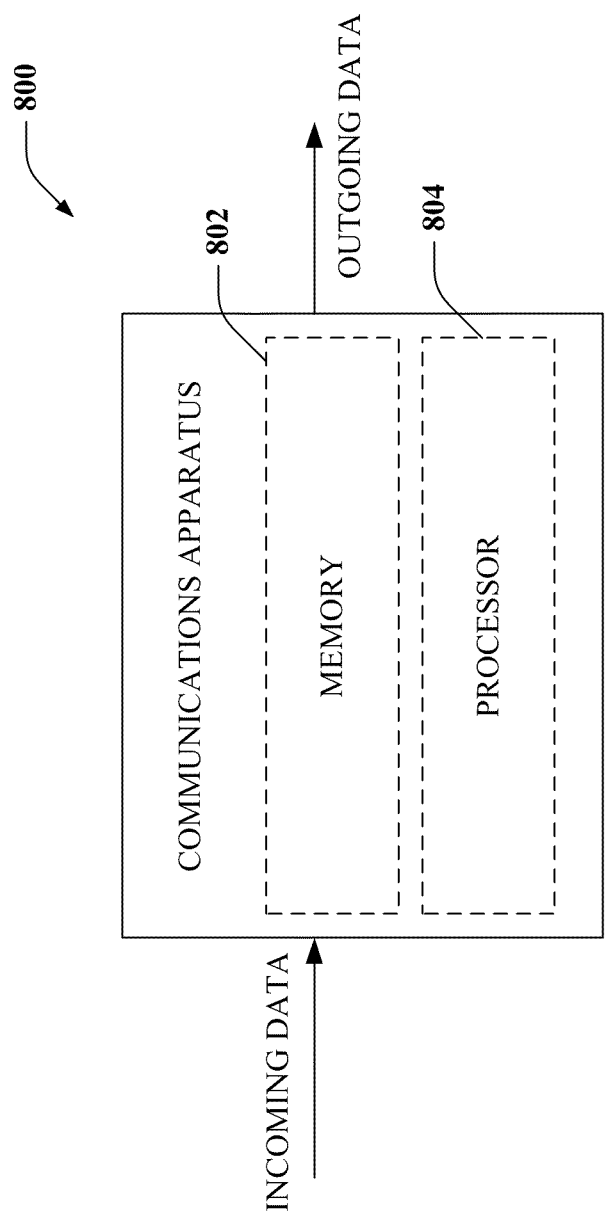
FIG. 8 illustrates an example communications apparatus that employ automatic cluster processes.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
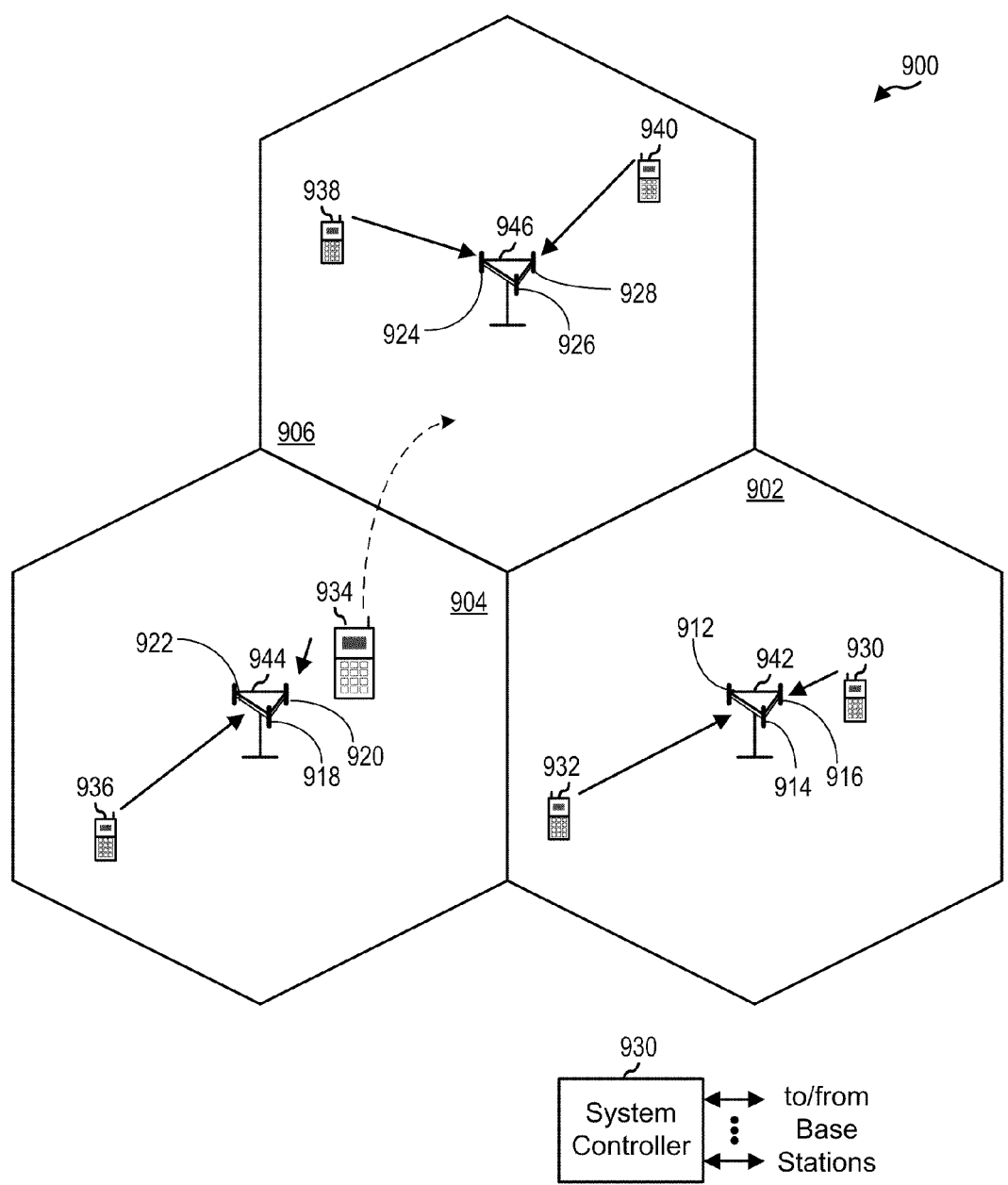
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
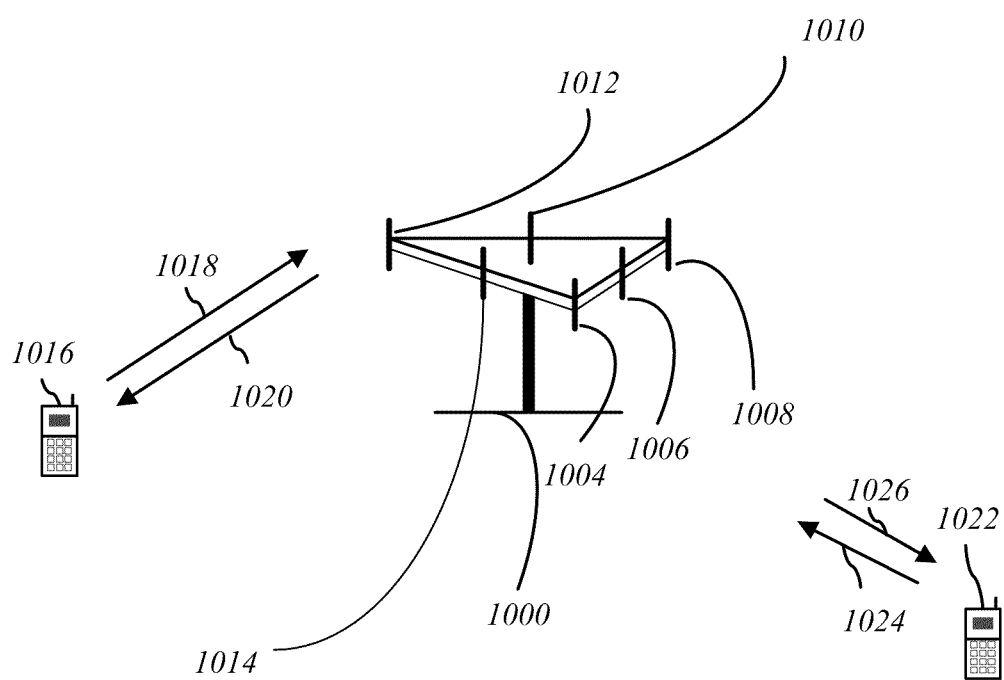
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
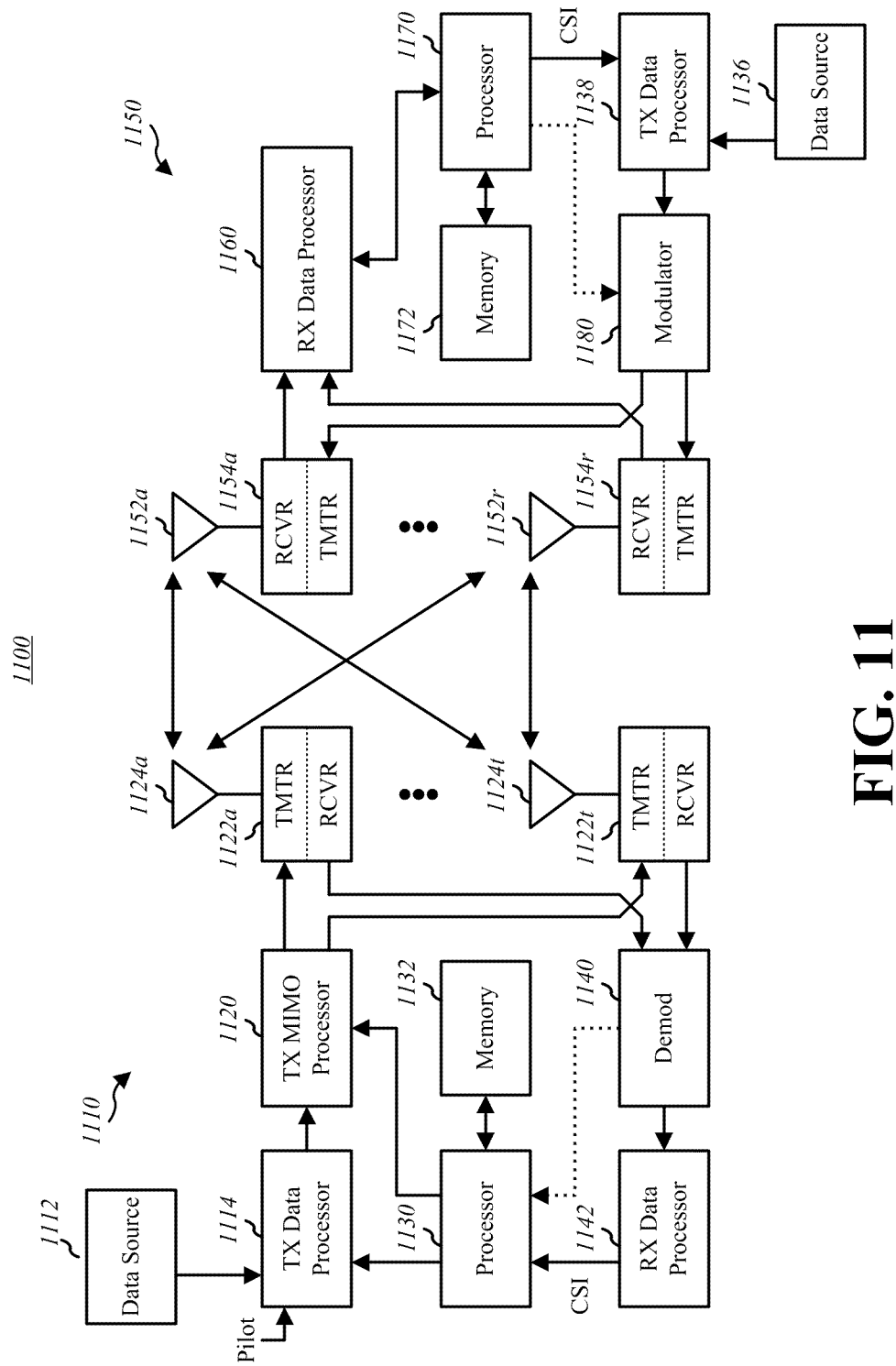

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which precoding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110. Parameters include resource allocation parameters, interference condition parameters, signal strength parameters, signal quality parameters, quality.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SD-CCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communications, comprising:
identifying a plurality of different network clusters each available to serve a cell in a network, wherein formation of the plurality of different network clusters is based at least in part on:
partitioning a network resource into a plurality of partitions, wherein a first plurality of partitions of the plurality of partitions corresponds to a first time period and a second plurality of partitions of the plurality of partitions corresponds to a second time period, and
allocating at least one of the plurality of partitions to each of the plurality of different network clusters, wherein the allocating includes allocating even subframes to a first network cluster of the plurality of different network clusters during the first time period and odd subframes to a second network cluster of the plurality of different network clusters during the second time period; and
dynamically selecting a network cluster from the plurality of different network clusters to provide wireless service to a user equipment in the cell using the at least one of the plurality of partitions that is allocated to the dynamically selected network cluster.

2. The method of claim 1, wherein formation of the plurality of different network clusters is based at least in part on network parameters that include time parameters, frequency parameters, resource allocation parameters, interference condition parameters, signal strength parameters, signal quality parameters, quality of service parameters, or signal-to-noise ratio (SNR) parameters.

3. The method of claim 1, wherein the network resource includes time, frequency, spatial dimensions or spreading codes.

4. The method of claim 1, further comprising controlling the formation of the plurality of different network clusters from a centralized network node.

5. The method of claim 1, further comprising controlling the formation of the plurality of different network clusters via distributed processing across multiple nodes.

6. The method of claim 1, further comprising adaptively controlling a specified time or frequency resource in response to changed network parameters.

7. The method of claim 1, wherein the first partition corresponds to a first frequency band and the second partition corresponds to a second frequency band.

8. The method of claim 1, further comprising reducing a utility that determines a cluster of the plurality of different network clusters and the at least one of the plurality of partitions that is allocated to the determined cluster based at least in part on a benefit analysis to a subset of user equipment.

9. The method of claim 1, further comprising identifying resource blocks allocated in a fixed manner over time or frequency.

10. The method of claim 1, further comprising shifting a base cluster of the plurality of different network clusters geographically and assigning different network resources to each cluster formed.

11. The method of claim 10, wherein the base cluster is assigned at least six different network resources to each cluster formed.

12. The method of claim 1, further comprising monitoring feedback from the user equipment to determine a suitable cluster of the plurality of different network clusters.

13. The method of claim 12, further comprising applying multiple cluster communications to a user equipment subset and monitoring feedback from the communications.

14. The method of claim 13, further comprising automatically selecting a cluster subset that optimizes network performance with the user equipment.

15. The method of claim 1, further comprising forming one or more master cells that are common across the plurality of different network clusters.

16. The method of claim 15, further comprising providing a data gateway to the master cells.

17. The method of claim 16, further comprising configuring one or more overlapping clusters in the network.

18. The method of claim 1, further comprising semi-statically reconfiguring the plurality of different network clusters based on network parameters and adapting the plurality of different network clusters to network requirements.

19. A communications apparatus, comprising:
a memory that retains instructions for:
identifying a plurality of different network clusters each available to serve a cell in a network, wherein formation of the plurality of different network clusters is based at least in part on:
partitioning a network resource into a plurality of partitions,
wherein a first plurality of partitions of the plurality of partitions corresponds to a first time period and a second plurality of partitions of the plurality of partitions corresponds to a second time period, and
allocating at least one of the plurality of partitions to each of the plurality of different network clusters, wherein the allocating includes allocating even subframes to a first network cluster of the plurality of different network clusters during the first time period and odd subframes to a second network cluster of the plurality of different network clusters during the second time period; and
dynamically selecting a network cluster from the plurality of different network clusters to provide wireless service to a user equipment in the cell using the at least one of the plurality of partitions that is allocated to the dynamically selected network cluster; and
a processor that executes the instructions.

20. The apparatus of claim 19, wherein formation of the plurality of different network clusters is based at least in part on network parameters that include time parameters, frequency parameters, resource allocation parameters, interference condition parameters, signal strength parameters, signal quality parameters, quality of service parameters, or signal-to-noise ratio (SNR) parameters.

21. The apparatus of claim 19, further comprising instructions for controlling the formation of the plurality of different network clusters from a centralized network node.

22. The apparatus of claim 19, further comprising instructions for controlling the formation of the plurality of different network clusters via distributed processing across multiple nodes.

23. The apparatus of claim 19, further comprising instructions for adaptively controlling a specified time or frequency resource in response to changed network parameters.

24. The apparatus of claim 19, wherein the first partition corresponds to a first frequency band and the second partition corresponds to a second frequency band.

25. A communications apparatus, comprising:
means for identifying a plurality of different network clusters each available to serve a cell, wherein formation of each of the plurality of different network clusters is based at least in part on:
  partitioning a network resource into a plurality of partitions, wherein a first plurality of partitions of the plurality of partitions corresponds to a first time period and a second plurality of partitions of the plurality of partitions corresponds to a second time period, and
  allocating at least one of the plurality of partitions to each of the plurality of different network clusters, wherein the allocating includes allocating even subframes to a first network cluster of the plurality of different network clusters during the first time period and odd subframes to a second network cluster of the plurality of different network clusters during the second time period, and
means for selecting a network cluster from the plurality of different network clusters to provide wireless service to a user equipment in the cell using the at least one of the plurality of partitions that is allocated to the selected network cluster.

26. The apparatus of claim 25, wherein formation of each of the plurality of different network clusters is based at least in part on network parameters that include time parameters, frequency parameters, resource allocation parameters, interference condition parameters, signal strength parameters, signal quality parameters, quality of service parameters, or signal-to-noise ratio (SNR) parameters.

27. A computer program product comprising:
a non-transitory computer-readable medium that includes code comprising:
  code for causing a computer to identify a plurality of different network clusters each available to serve a cell, wherein formation of each of the plurality of different network clusters is based at least in part on:
    partitioning a network resource into a plurality of partitions, wherein a first plurality of partitions of the plurality of partitions corresponds to a first time period and a second plurality of partitions of the plurality of partitions corresponds to a second time period, and
    allocating at least one of the plurality of partitions to each of the plurality of different network clusters, wherein the allocating includes allocating even subframes to a first network cluster of the plurality of different network clusters during the first time period and odd subframes to a second network cluster of the plurality of different network clusters during the second time period; and
  code for causing a computer to determine a network cluster from the plurality of different network clusters to provide wireless service to a user equipment in the cell using the at least one of the plurality of partitions that is allocated to the determined network cluster.

28. The computer program product of claim 27, wherein formation of each of the plurality of different network clusters is based at least in part on network parameters that include time parameters, frequency parameters, resource allocation parameters, interference condition parameters, signal strength parameters, signal quality parameters, quality of service parameters, or signal-to-noise ratio (SNR) parameters.

29. A communications apparatus, comprising:
means for processing a set of network parameters;
means for identifying a plurality of different network clusters each available to serve a cell, wherein formation of each of the plurality of different network clusters is based at least in part on:
  the set of network parameters,
  partitioning a network resource into a plurality of partitions, wherein a first plurality of partitions of the plurality of partitions corresponds to a first time period and a second plurality of partitions of the plurality of partitions corresponds to a second time period, and
  allocating at least one of the plurality of partitions to each of the plurality of different network clusters, wherein the allocating includes allocating even subframes to a first network cluster of the plurality of different network clusters during the first time period and odd subframes to a second network cluster of the plurality of different network clusters during the second time period; and
means for associating a network cluster from the plurality of different network clusters with providing wireless service to a user equipment in the cell using the at least one of the plurality of partitions that is allocated to the associated network cluster.

30. The apparatus of claim 29, wherein formation of each of the plurality of different network clusters is based at least in part on the set of network parameters that include resource allocation parameters, interference condition parameters, signal strength parameters, signal quality parameters, quality of service parameters, or signal-to-noise ratio (SNR) parameters.

31. The apparatus of claim 29, further comprising
means for monitoring feedback from the user equipment to determine a suitable cluster of the plurality of different network clusters.

32. The apparatus of claim 31, further comprising:
means for applying multiple cluster communications to a user equipment subset; and
means for monitoring feedback from the communications.

33. The computer program product of claim 27, further comprising
code for monitoring feedback from the user equipment to determine a suitable cluster of the plurality of different network clusters.

34. The computer program product of claim 33, further comprising:
code for applying multiple cluster communications to a user equipment subset; and
code for monitoring feedback from the communications.

* * * * *